US00RE36343E

United States Patent [19]

Silva

[11] E Patent Number: Re. 36,343

[45] Reissued Date of Patent: Oct. 19, 1999

[54] DRAIN FILTERING DEVICE

[76] Inventor: Charles Silva, Rte. 2, Box 183, Templeton, Calif. 93465

[21] Appl. No.: 08/965,387

[22] Filed: Nov. 6, 1997

Related U.S. Patent Documents

Reissue of:

[64] Patent No.: 5,536,406
Issued: Jul. 16, 1996
Appl. No.: 08/389,342
Filed: Feb. 15, 1995

[51] Int. Cl.[6] ..... B01D 35/02; B01D 35/22

[52] U.S. Cl. ..... 210/460; 210/477; 52/12

[58] Field of Search ..... 52/11, 12; 210/459, 210/460, 473, 474, 475, 477

[56] References Cited

U.S. PATENT DOCUMENTS

| | | | |
|---|---|---|---|
| 2,210,248 | 8/1940 | Lighthill | 52/12 |
| 2,533,402 | 12/1950 | Schmitz, Jr. | 52/12 |
| 3,409,138 | 11/1968 | Lawrence | 52/12 |
| 3,507,396 | 4/1970 | Homa | 52/12 |
| 3,741,398 | 6/1973 | Abramson | 210/474 |
| 4,253,281 | 3/1981 | Ruttenberg | 52/12 |
| 4,272,370 | 6/1981 | Cunning | 52/12 |
| 4,418,504 | 12/1983 | Lassiter | 52/12 |
| 4,455,791 | 6/1984 | Elko et al. | 210/163 |
| 4,472,274 | 9/1984 | Williams | 210/447 |
| 4,604,837 | 8/1986 | Beam | 52/12 |
| 4,615,153 | 10/1986 | Carey | 52/12 |
| 4,745,709 | 5/1988 | Johnson | 52/12 |
| 4,745,710 | 8/1988 | Davis | 52/12 |
| 4,765,101 | 8/1988 | Wolf | 52/12 |
| 4,769,957 | 9/1988 | Knowles | 52/12 |
| 4,841,686 | 6/1989 | Rees | 52/12 |
| 4,964,247 | 10/1990 | Spica | 52/12 |
| 4,965,969 | 10/1990 | Antenen | 52/12 |
| 5,044,581 | 9/1991 | Dressler | 248/48.1 |
| 5,072,551 | 12/1991 | Manoogian, Jr. | 52/12 |
| 5,095,666 | 3/1992 | Williams, Jr. | 52/11 |
| 5,103,601 | 4/1992 | Hunt | 52/12 |
| 5,242,591 | 9/1993 | Beechert et al. | 210/474 |
| 5,526,612 | 6/1996 | Wade | 52/12 |
| 5,535,554 | 7/1996 | Harris, Jr. | 210/474 |

FOREIGN PATENT DOCUMENTS

| | | | |
|---|---|---|---|
| 6117065 | 4/1994 | Japan | 52/12 |
| 6716785 | 6/1969 | Netherlands | 52/12 |

*Primary Examiner*—John Kim
*Attorney, Agent, or Firm*—Leo F. Costello

[57] ABSTRACT

A drain filtering device is disclosed. The improvement over the prior art [is comprised of] *includes* reducing the filter size from an elongated device that spans the length of [the gutter] *drain* system to a modular unit which is necessary only at the drain [sight] *outlet*. The [invention also includes] *filtering device has* an inclined upper face which is positioned on the upstream side of the [drain in the gutter and a downspout] *channel of the drain and an* attachment which locates the [invention] *filtering device* in the [gutter] *channel* such that the flow of filtered water passes through the [invention] *device* and into the [downspout] *outlet*. The debris that collects in the [gutter] *channel* is carried along the with the water until it makes contact with the inclined upper face and is forced up the incline until the overflow debris flows over the side of the [gutter] *channel* thereby cleaning *the* same and preventing the [downspout] *outlet* from becoming clogged.

35 Claims, 4 Drawing Sheets

DRAIN FILTERING DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The invention disclosed herein relates to a device for filtering open drains and thereby preventing them from being clogged. More particularly this invention relates to a device for filtering drains, the drains including [of] at least one *channel or passageway, such as a* gutter *or ditch,* with side walls and an open top side and at least one [drain hole positioned therein] *outlet in communication with the channel,*the drain [comprising an elongated tube containing said hole and] allowing [said] water to flow [therethrough, such as the gutter and down spouts on buildings] *through the channel and into the outlet. Examples of drain systems where the invention is especially useful are the gutter and downspout of a building, a ditch leading to a culvert under a roadway, or the like.*

2. Overview of Prior Art

Since the invention of the rain gutter and [having them] *its use* on a building with trees nearby, the problem of clogging the down spouts with leaves and other debris has plagued homeowners and building managers alike. Tree leaves, small branches and other debris fall from trees, particularly as a result of high winds and rain. When this happens, the roofs of the buildings accumulate the debris, and in the event of rain or melting snow, the debris is washed into the gutters and finally carried with the water to the down spouts. When this happens the down spouts typically get clogged with the debris, damming up the spout *and* forcing the water to fill up in the gutter until it flows over the sides, voiding the function of the gutter.

Numerous devices have been developed in an attempt to meet the need for providing a debris-free downspout. To date, only marginal success has been reached. One group of devices incorporate laying a material over the top of the gutter, such as is disclosed by Antenen in U.S. Pat. No. 4,965,969. The material is porous so that the water can get through but the debris cannot get into the gutter. Variations in this approach are offered by Rees in U.S. Pat. No. 4,841,686; Knowles in U.S. Pat. No. 4,769,957; Wolf in U.S. Pat. No. 4,765,101; Davis in U.S. Pat. No. 4,745,710; Lassiter in U.S. Pat. No. 4,418,504 and Abramson in U.S. Pat. No. 3,741,398. The general improvements in the later patents, from the earlier disclosed, is a trend toward simplification. The overall shortcoming is that each of these devices must be custom-made to each individual dwelling. Never did any of these devices take into account the fact that the debris is not damaging in the gutter. The gutter is open on the top to catch the flow off of the roof of the building. If excessive debris gets into the gutter, it will simply fall out. It is the downspout where the problem lies. This is an enclosed tube. If it gets full, it clogs and does not allow the runoff water to flow through. Preventing the debris from getting into the gutter is a complicated and unnecessarily expensive way to solve the problem.

Modifications to the afore mentioned methods have been made. The afore mentioned disclosures utilize a substantially flat material which accepts the downward slope of the roof to keep the debris from accumulating on the structure. The problem being in a heavy rain a portion of the runoff water will not fall through the porous material and run off the structure, oblivious to the gutter. Williams, Jr. in U.S. Pat. No. 5,095,666 and Dressier in U.S. Pat. No. 5,044,581 addressed this concern by making a separate variation in an upwardly curved section of material beginning in the area of the side of the gutter which is closest to the building. This aligns the porous components of the material with the direction of flow of the water, decreasing the overrun potential of the water. In a similar fashion Manoogian, Jr. proposed a trough which extended into the gutter in U.S. Pat. No. 5,072,551. This enhanced the flow of the water into the gutter [in as] *as in* the two latter mentioned disclosures. An obvious problem is where the section designed to catch the water will also catch the debris. If the flat debris, such as leaves, coat this section, the [water could] *debris may* be [made] impermeable to the [material and] *water so that the water* again [defy] *defies* the gutter all together. These *devices* also must run the length of the gutter in order to be effective, [therefore the oversight of the] *so that once again,* specific attention *is not given* to the downspout [is also avoided] *where the real problem exists.*

Attempts have been made to clean the gutter by [use] *using* mechanical means. Johnson and Ruttenberg in U.S. Pat. Nos. 4,745,709 and 4,253,281 respectively provide ways of cleaning the gutters without a ladder and rake. Johnson utilizes a flexible liner which can be inverted to dispel the debris out of the gutter. The obvious disadvantage being, unless the liner is cleaned continuously, debris will flow into the downspout. Ruttenberg combined the ideas of the material permeable to water but not tree debris, spanning the width of the gutter and made it movable, thereby providing a means for remotely removing the leaves. The maintenance of attending to the device along with the unnecessary expense makes it impractical. Ruttenberg also disclosed a method of moving the material utilizing wind power and a fan to eliminate the necessity of physically actuating the device, but a mechanically rotating mechanism subjected to environmental conditions over prolonged periods of time make the feasibility of the wind generating enough power to move long stretches of material unlikely.

Beam in U.S. Pat. No. 4,604,837 and Elko et. al. in U.S. Pat. No. 4,455,791 both disclose methods of having the gutter completely covered by a rigid member and using the surface tension of the water to pull the water without the accompanying debris into the gutter. This system only works when the runoff water is at a minimum. During heavy downpours the device is of little value as a gutter system.

With all of the afore mentioned devices attachment to the roof of the dwelling is necessary. Beecheft et al. and Hunt address these shortcomings in U.S. Pat. Nos. 5,242,591 and 5,103,601 respectively. The devices are similar in that the material [is] proposed [of ] *is* a mesh material which is formed into a geometric shape and [fit] *fits* longitudinally along the length of the gutter. In this, the debris that will accumulate is able to blow or run off the top surface of the device and allow the water to fall therein. As before, this does not address the unnecessary complication and expense of custom-made devices to cover the entire length of the gutter systems.

This problem was addressed by Williams in U.S. Pat. No. 4,472,274. Here Williams proposed a drain spout attachment that included a [grade] *grate* on an incline sloping down to a open section of the device. The water and debris was allowed to flow into the down spout where it is separated by the [grading] *grating.*The debris would fall out of the opening and the water would flow through the [grading] *grating* and into the down-spout. The problem with this is the lack of retrofitability with existing gutter systems. Gutter systems would have to be rebuilt or replaced to incorporate the device and the flowing debris must still traverse a limited size opening to get into the device from the gutter. What debris makes it that far must be carried out of an opening of very limited physical dimension, due to the size restriction of the downspout. If the device clogs there, very little is saved.

SUMMARY OF THE INVENTION

The object of the disclosed invention is to provide a filtering [system] *device* for any [gutter and] drain [combination] *system including a channel leading to an outlet* in which the removal of excessive debris from the drain is desirable *to prevent clogging of the outlet.* [Such a device would include] *Such a filtering system is useful for* a rain gutter and downspout system on a residential or commercial dwelling, *for a culvert or like drain system under a roadway, or like drain systems.*In [this case] *such cases* it is common for leaves and other debris to clog the [downspout] *outlet* rendering the drainage system unusable. The process of opening the drain can be very tedious especially with long down spouts such as in a multilevel structure *or with wet, tangled and heavy debris in a culvert.*

The *present filtering* device includes *a* rigid structure that is pervious to water but not to leaf and other tree debris and the like. The device is receivable by [a gutter] *the channel of the drain system* and has an attachment to the [downspout or drain of the gutter] *outlet of the system.*The device also has an inclined face [on the side opposite to the downspout attachment] which angles from the floor of the [gutter up and back toward the downspout side. When water] *channel in the direction of the flow of water. Water* carries [the] debris down the [gutter] *channel* toward the [downspout the combination comes] *outlet and* into contact with the [angled wall] *inclined face.* The water flows through and the debris accumulates, the debris being pushed up the incline of the [wall] *face* as more debris is added. When the debris becomes high enough, it flows over the side of the [gutter] *channel*, cleaning *the* same without clogging the [downspout] *outlet.*

[The] *As otherwise described and shown herein, the* disclosed invention may also be used for a variety of situations other than building gutters. [Any] *For a gutter application, however, any* drain with an attached gutter with side walls can utilize the invention. Since the invention is received by the gutter only in the area of the downspout, the device need not be custom made. Only variations in gutter width and potentially in downspout opening sizes are necessary. These are predominantly standard sizes.

DETAILED DESCRIPTION OF THE PREFERRED EMBODIMENT

Figure 1:
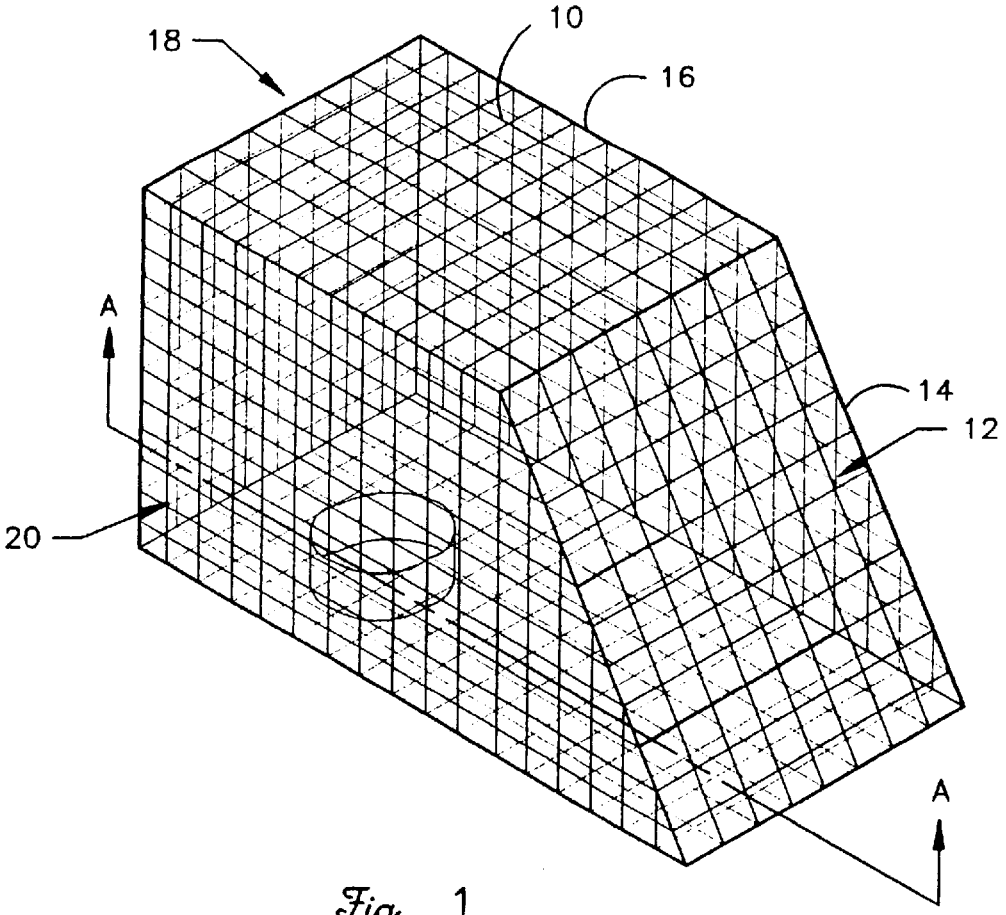
FIG. 1 is an isometric view of a drain filtering device produced in accordance with preferred embodiment of the present invention.

Referring to the drawings, a device constructed in accordance with the present invention is shown in FIG. 1, and comprises a structure made of a wire mesh 10. The invention also includes an upper face 12 which is comprised of two parts, an inclined portion 14 and a flat portion 16. This structure is supported by a rear face 18 and two vertical *side* faces 20. Though the structure is shown here to be of wire mesh construction the present invention could be manufactured of a variety of materials [in which end itself to be] *with the objective being to provide a structure that is* durable and non-corrosive in nature and possesses a permeability to water but not to leaves and similar debris.

Figure 2:
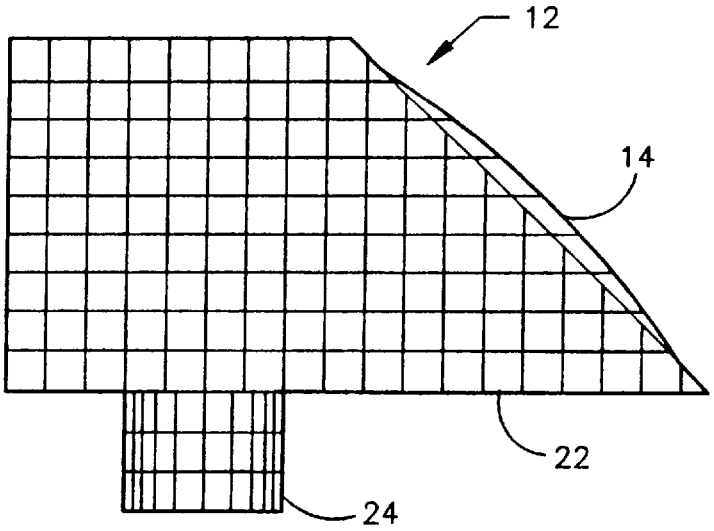
FIG. 2 is a side sectioned view of the preferred embodiment of the present invention showing front curve along the upper face, the section along line A—A as shown in FIG. 1.

With reference now to FIG. 2, the sectioned view of the invention as depicted in FIG. 1 is shown. In this view a bottom face 22 is shown with a down spout attachment 24 which consists of a hollow extension fastened to the bottom face 22 encapsulating a hole in the bottom face 22. If the bottom face is made of a water permeable material the presence of the hole in the bottom face 22 is not necessary.

The upper face 12 is also shown in greater detail in FIG. 2. The inclined portion 14 is shown with a front curve. This curve projects out more along the midline or section line of this view. The purpose of the curve is to further assist the leaves and other debris from sticking to the inclined portion 14.

The down spout attachment 24 is shown extending out of the bottom face 22 and is capable of being received by the downspout in a typical gutter system. This locates the invention in the gutter and directs the filtered water into the downspout.

Figure 3:
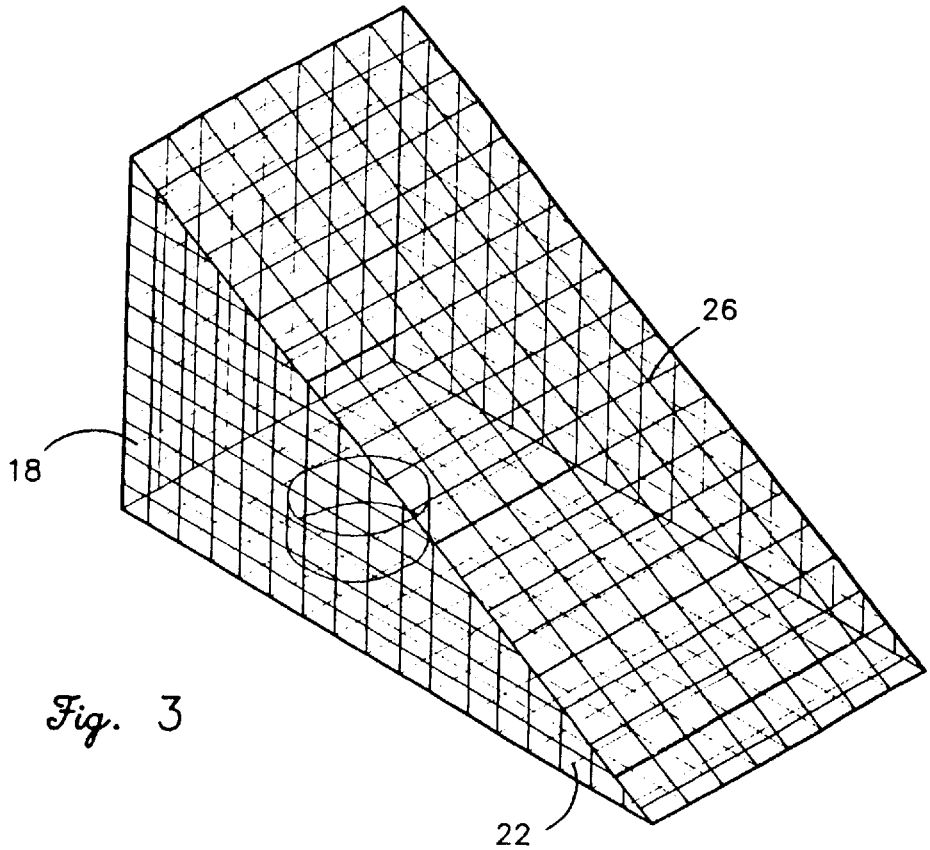
FIG. 3 is an isometric view of an alternative of the preferred embodiment of the present invention utilizing an elongated upper face.

The invention can also be made in a five face unit, as best seen in FIG. 3. In this case the upper face 26 has only an inclined portion that connects the bottom face 22 and the rear face 18. The rest of the attributes of the invention are similar to the six faced device as shown in FIG. 1 and disclosed herein.

Figure 4:
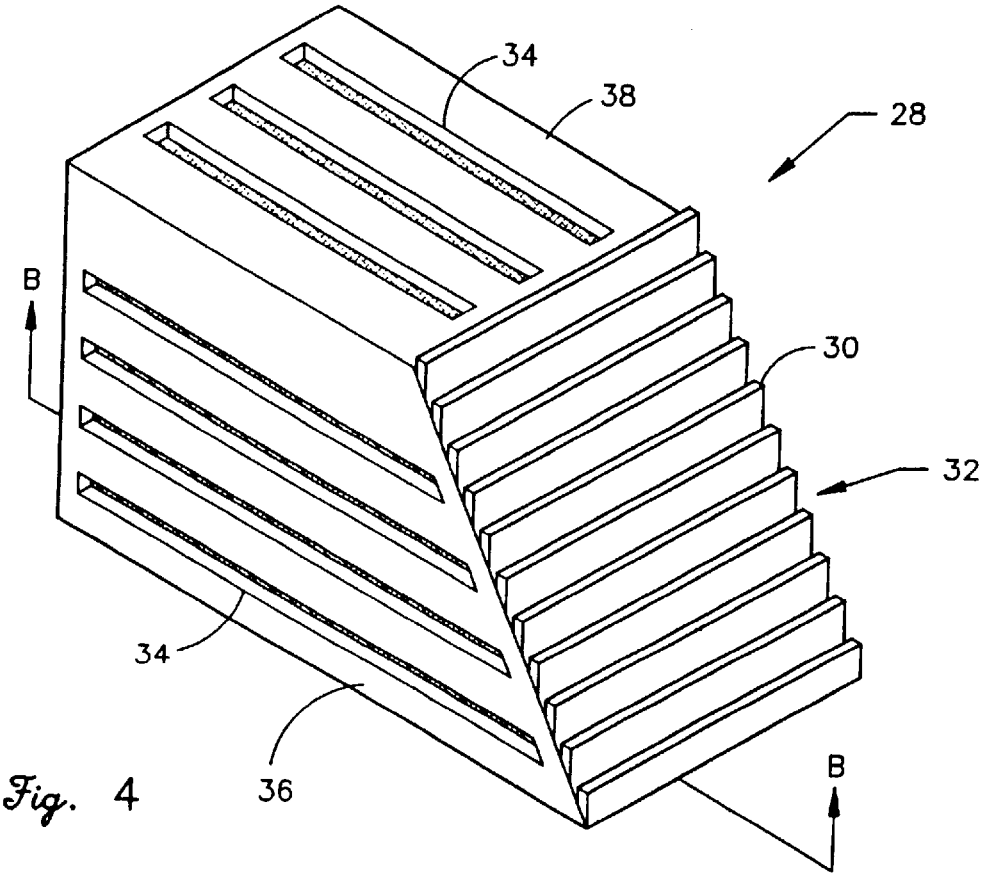
FIG. 4 is an isometric view of an alternative of the preferred embodiment of the present invention utilizing a slotted upper face.

FIG. 4 shows another alternative design of the invention. In this the upper face 28 is comprised of a series of slats 30 which then provide a plurality of openings on a upward slant of the incline portion 32. In this case the preferred embodiment of the invention would be constructed of a rigid material such as galvanized sheet metal or molded plastic. Additional slots 34 are positioned along the vertical faces 36 and the flat portion 38 of the upper face 28 to accommodate the passage of water into the cavity of the device and eventually out into the downspout. In this case the device is similar to those already mentioned.

Figure 5:
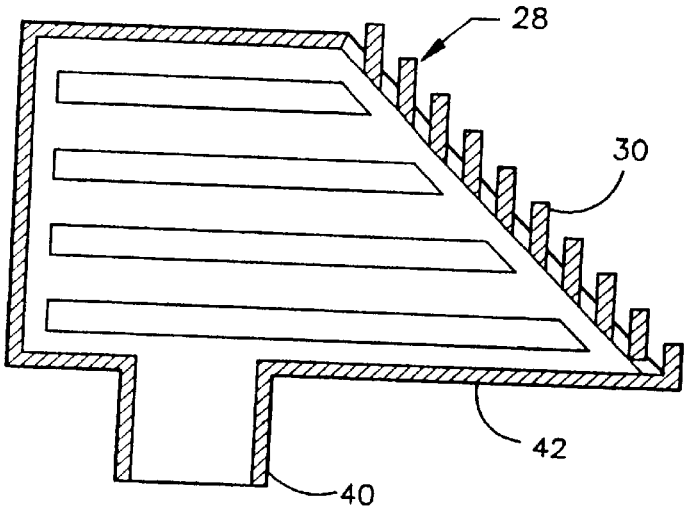
FIG. 5 is a side sectioned view of the alternate of the preferred embodiment of the present invention as shown in FIG. 4 and sectioned along the line B—B.

A sectioned view of the preferred embodiment as shown in FIG. 4 and sectioned along the line B—B, is shown in FIG. 5. In this view the down spout attachment 40 is shown as a continuous member of the bottom face 42. The slats 30 which comprise the inclined portion of the upper face 28 is shown in more detail. It can be easily seen that water can easily pass between the slats 30 into the cavity of the device and out the down spout attachment 40.

Figure 6:
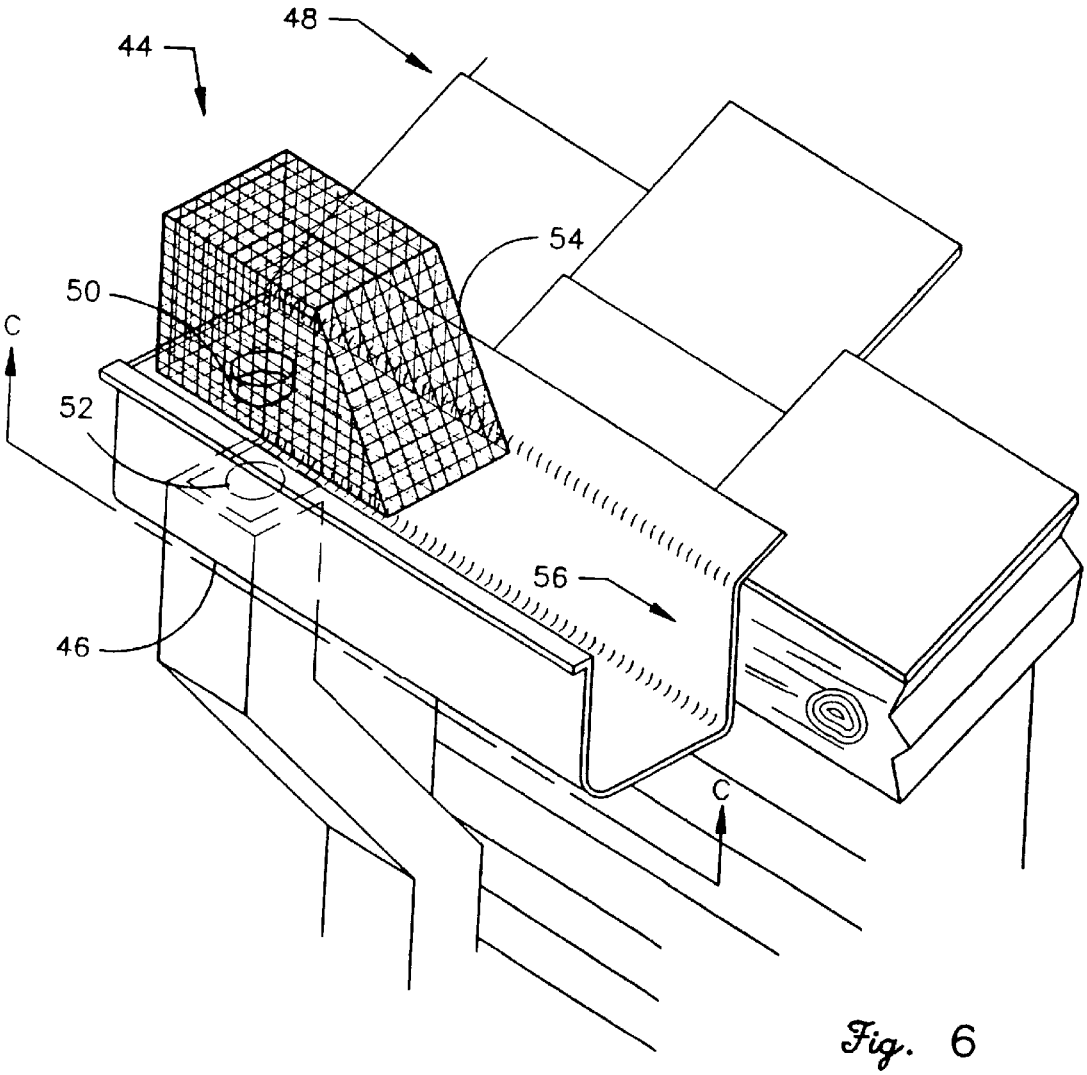
FIG. 6 is an exploded isometric view of a typical use of the preferred embodiment of the present invention as shown used in a gutter system on a building.

FIG. 6 shows a typical application of the invention. In this case the [invention] *filtering device* 44 is positioned in the gutter 46 of a building 48 aligning the down spout attachment 50 with the down spout opening 52. The [invention] *filtering device* 44 is positioned such that the upper face 54 is facing the open side 56 of the gutter.

Figure 7:
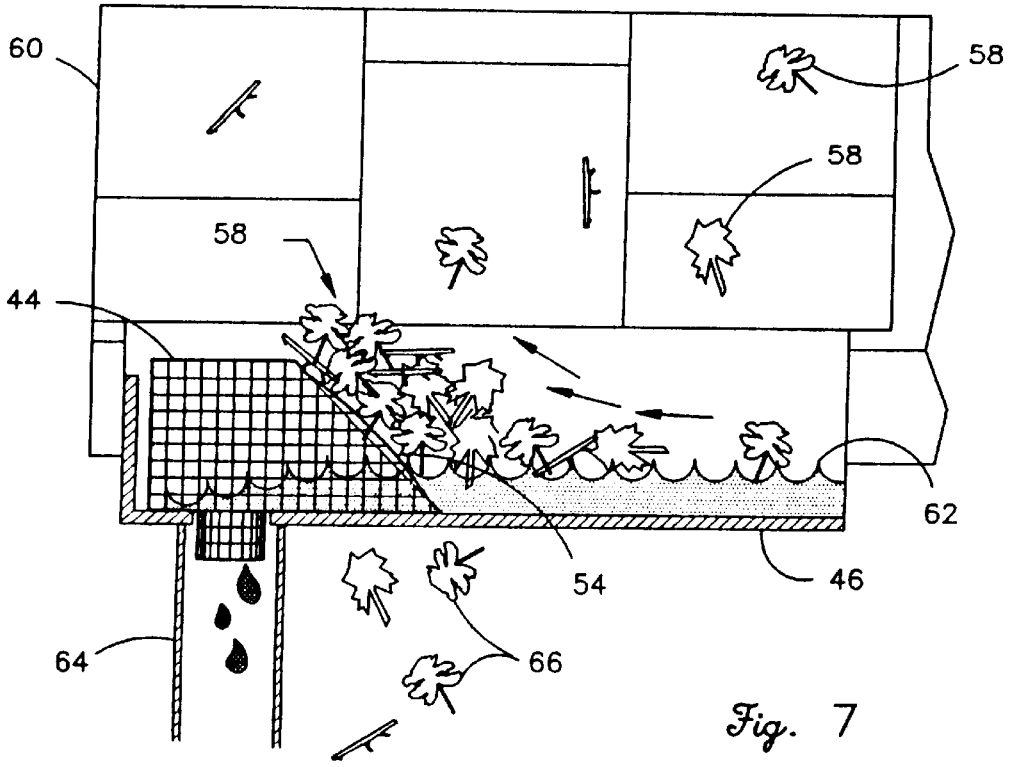
FIG. 7 is a side sectioned view of a use of the preferred embodiment of the present invention as shown in FIG. 6 and sectioned along the line C—C, showing the movement of leaves and debris with the water up the upper face and out of the gutter.

The action of the [invention] *filtering device* 44 is shown in FIG. 7 as a section cut along the line C—C in FIG. 6. In this the leaves 58 and other debris are washed from the roof 60 into the gutter 46, *and* the water 62 in the gutter 46 carries the debris 58 on its way to the downspout 64. When the debris 58 contact the upper face 54 of the [invention 44] *filtering device,* the water is able to pass therethrough into the downspout 64 but the debris 58 being physically [to] *too* large to fit through, the material is pushed up the inclined portion of the upper face 54. This continues until the height of the debris 58 is greater than the height of the gutter 46 and overflow debris 66 falls out of the gutter 46.

Figure 8:
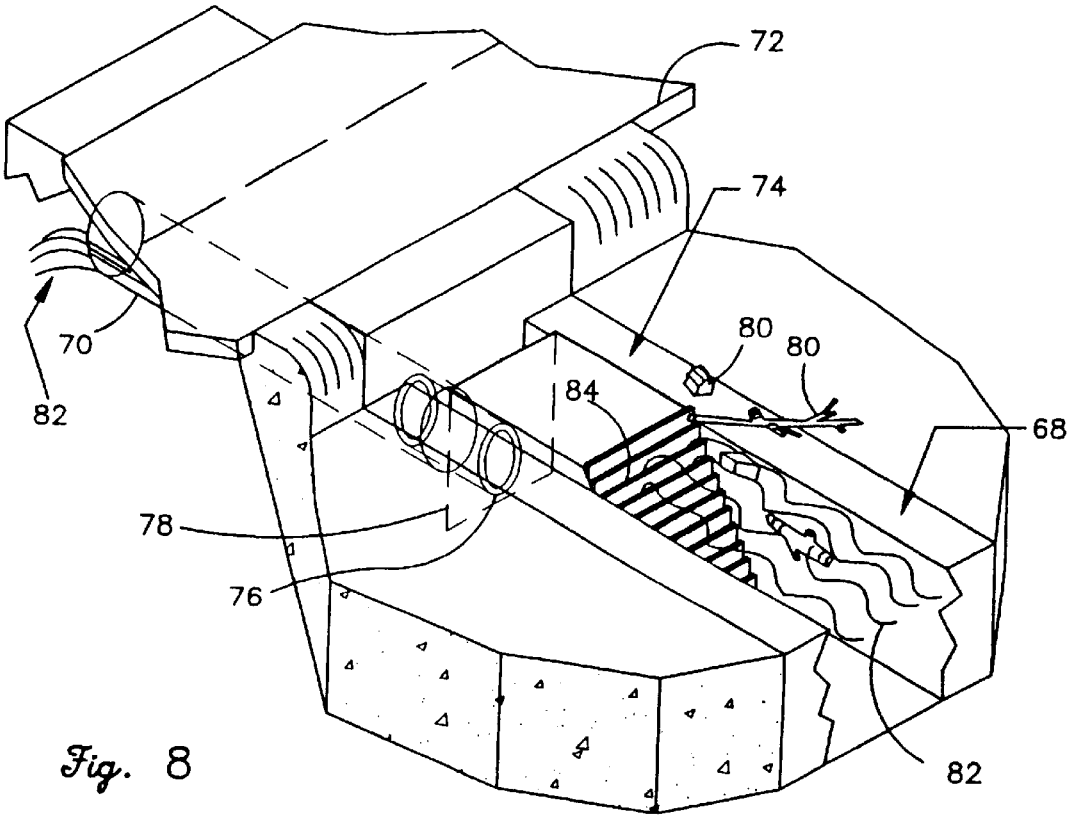
FIG. 8 is an isometric view of a drainage or irrigation ditch *and culvert* utilizing the filtering device as disclosed herein.

The invention has uses which include any open trench or canal with side walls and a drain *or outlet*. FIG. 8 shows a typical example of an open ditch 68 in which the water must pass through an opening, such as a culvert 70 under a roadway 72. [In this, the invention 74 is similarly placed into the water passageway 68 only in this case, the spout attachment 76 situated in the rear face 78 of the invention 74. This is] *A filtering device 74 made in accordance with principles described above is placed in the ditch 68 adjacent to the entrance to the culvert 70, that is adjacent to the outlet from the ditch. In this case, a spout attachment 76 projects from the rear face 78 of the filtering device,* due to the commonly horizontal [arrangement of the culvert 70] *alignment of the inlet or entrance to the culvert and the outlet from the ditch or channel of the drain system. Accordingly, the attachment is fitted into the entrance to the culvert.* The debris 80 is picked up out of the flowing water 82 by virtue of being forced up the inclined portion 84, in a manner as previously described.

What is claimed is:

1. A [gutter] filter *for a drain system in which water and debris including leaves move along a channel toward an outlet,* comprising:

A. a rigid structure having at least two substantially vertical faces and at least three additional faces including a bottom face, a rear face and an upper face, the combination forming a closed three dimensional polygon, at least one face having a section of material removed therefrom, creating a hole therein and having a hollow tube attached thereto, thereby forming a hollow extension out of the [face, and a hollow portion thereby continuous with the] interior of the closed polygon;

B. the rear face positioned adjacent to said bottom face and said vertical faces, thereby adjoining said faces; and C. the upper face being pervious to water but not to *undesired* debris found in the water, the upper face adjoined at some acute angle *directly* to said bottom face *and forming a ramp extending upwardly from the bottom face* and also adjoined with said vertical faces and said rear face, whereby said hollow extension is capable of being received by the [downspout] *outlet* of a [gutter] *drain* system with the [(remaining structure)] closed three dimensional polygon being received [by] *in* the [gutter] *channel*, the upper face allowing the water from the [gutter] *channel* to pass into the [downspout] *outlet* without the leaves and other *undesired* debris, which are forced up the [incline created by] *ramp formed by* the upper face [with respect to said bottom face,] by the flowing water, thus carrying the debris [over] *to* the sides of the [gutter] *channel* and thereby cleaning same, thus preventing the debris from clogging the [downspout] *outlet*.

2. The filter as described in claim 1, further comprising a handle suitable for assisting in the placement and removal of the filter into and out of said [gutter] *channel*.

3. The filter as described in claim 1, wherein said acute angle is approximately 30 to 45 degrees.

4. The filter as described in claim 1, wherein said upper face is comprised of an angled portion *constituting the ramp* and a flat portion, the flat portion being substantially parallel to said bottom face and attached to said rear face and the angled portion attached to the front of said bottom face and creating an acute angle therewith.

5. The filter as described in claim [4] *1*, wherein said acute angle is approximately 30 to 45 degrees.

6. The filter as described in claim 1, wherein the [shape of said] hollow extension is cylindrical in shape.

7. The filter as described in claim 1, wherein the [shape of said] hollow extension is oval in shape.

8. The filter as described in claim 1, wherein said upper face is comprised of an angled portion *constituting the ramp*, a rear edge of which is attached to said rear face and a front edge of [the angled portion] *which* is *directly* attached to the front *edges* of said bottom face, thereby creating an acute angle therewith.

9. The filter as described in claim 1, wherein said upper face [is comprised of a mesh material which] provides openings [of approximately 0.25 inches by 0.25 inches] substantially evenly distributed over said upper face.

10. The filter as described in claim 9, wherein said [mesh material] *upper face* is comprised of [galvanized steel] *spaced* wire *elements providing said openings therebetween*.

11. The filter as described in claim 9, wherein said *upper face is a* mesh material [is] comprised of a plastic material.

12. A [gutter] filter *for a drain system in which water and debris including leaves move along a passageway toward an outlet,* comprising:

A. a rigid structure having at least two substantially vertical faces and at least three additional faces including a bottom face, a rear face and an upper face, all of the faces being pervious to water but not to *undesired* debris found in the water, the combination forming a closed three dimensional polygon, at least one face having a section of material removed therefrom, creating a hole therein and having a hollow tube attached thereto, thereby forming a hollow extension out of the face, and [a hollow portion thereby being continuous] *being in communication* with the interior of the closed polygon;

B. the rear face positioned adjacent to said bottom face and said vertical faces, thereby adjoining said faces; and C. the upper face adjoined at some acute angle to said bottom face and also adjoined with said vertical faces and said rear face, whereby said hollow extension is capable of being received by the [downspout] *outlet* of a [gutter] *drain* system with the closed three dimensional polygon being received by the [gutter] *passageway*, the upper face and adjoining faces allowing the water from the gutter to pass into the [downspout] *outlet* without the leaves and other *undesired* debris, which are forced up the incline created by the upper face with respect to said bottom face, by the flowing water, thus carrying the debris [over] *to* the sides of the [gutter] *passageway* and cleaning same, thus preventing the debris from clogging the [downspout] *outlet*.

[13. The filter as described in claim 12, further comprising a handle suitable for assisting in the placement and removal of the filter into and out of said gutter.]

14. The filter as described in claim 12, wherein said acute angle is approximately 30 to 45 degrees.

15. The filter as described in claim 12, wherein said upper face is comprised of an angled portion and a flat portion, the flat portion being substantially parallel to said bottom face and attached to said rear face and the angled portion attached to the front of said bottom face and creating an acute angle therewith.

[16. The filter as described in claim 15, wherein said acute angle is approximately 45 degrees.]

[17. The filter as described in claim 12, wherein the shape of said hollow extension is cylindrical in shape.]

[18. The filter as described in claim 12, wherein the shape of said hollow extension is oval in shape.]

[19. The filter as described in claim 12, wherein said upper face is comprised of an angled portion, a rear edge of which is attached to said rear face and a front edge of the angled portion is attached to the front of said bottom face, thereby creating an acute angle therewith.]

20. The filter as described in claim [12] *1*, wherein *all of* said faces are comprised of a mesh material which provides openings of approximately 0.25 inches by 0.25 inches, substantially evenly distributed over said faces.

[21. The filter as described in claim 20, wherein said mesh material is comprised of galvanized steel wire.]

22. The filter as described in claim 20, wherein said mesh material is comprised of a plastic material.

*23. A filter for a drainage system having a channel providing a bottom surface along which water and debris move toward an outlet, comprising:*

*A. a water-pervious three-dimensional structure having top, bottom and rear faces and a pair of side faces, said top face being an inlet face, and at least one of said bottom, rear and side faces being an outlet face, the outlet face being porous, the top face being porous to water but not to undesired debris so that water can pass therethrough and enter the structure but undesired debris cannot, said top face joining the bottom face at an acute angle defining a lower front corner of the structure and creating a ramp leading up from the corner along the top face,*

*B. said structure having a channel positioning member extending therefrom capable of positioning the structure in the channel of a drain system with the outlet face in fluid communication with the outlet from the channel, with the bottom face lying on the bottom surface of the channel, with the front corner meeting the bottom surface of the channel, and with the top face forming an obtuse angle with said bottom surface, whereby water flowing in the channel flows through the top face into the structure but debris in the water strikes the top face and is forced upwardly along the ramp and off the top face to clear the same.*

*24. The filter of claim 23,*

*wherein the channel positioning member is on the bottom face.*

*25. The filter of claim 23,*

*wherein the channel positioning member is on the rear face.*

*26. The filter of claim 23,*

*wherein the channel positioning member is a hollow tube projecting from the outlet face.*

*27. The filter of claim 23,*

*wherein the channel is a gutter, wherein the outlet leads into a downspout, and wherein the channel positioning member is a tube on the bottom face extendable into the downspout.*

*28. The filter of claim 23,*

*wherein the channel is a ditch, the outlet leads into a culvert, and the positioning means is a tube on the rear face extendible into the culvert.*

*29. A drain filtering device for use in a drainage system wherein water and debris are channeled toward an outlet comprising:*

*a three-dimensional, multi-faced structure having a top, a bottom, opposite sides, a front and a rear,*

*said structure also having a plurality of faces, one of which is a top inlet face porous to water but not to undesired debris that could clog an outlet from the drainage system, and another of which is an outlet face porous to water,*

*said structure having an internal passageway that allows water entering the top face to pass therethrough to the outlet face,*

*said top face being directly connected at some acute angle to the bottom of the structure and forming a ramp leading directly upwardly and rearwardly from the bottom of the structure; and*

*a locating member projecting from the structure adapted to position the structure in the drain system so that the top face can intercept water and debris flowing in the drain system, so that water can enter the structure through the inlet face and exit the structure through the outlet face into the outlet, and so that undesired debris in the water will be forced against the top face and thence upwardly therealong by following debris washed thereagainst by the flowing water.*

*30. The filtering device of claim 29,*

*wherein the locating member extends outwardly from the outlet face for extension into the outlet of the drain system.*

*31. The filtering device of claim 30,*

*wherein the locating member is a conduit for conducting water into the outlet.*

*32. The filtering device of claim 29,*

*wherein the structure is a cage-like structure.*

*33. The filtering device of claim 32,*

*wherein said structure is made of elongated, transversely spaced elements.*

*34. The filtering device of claim 33,*

*wherein the elements are wire.*

*35. The filtering device of claim 32,*

*wherein said structure is made of sheet material having openings therein.*

*36. The filtering device of claim 35,*

*wherein the sheet material is plastic.*

*37. A filter for a drain system in which water and debris including leaves move along a passageway toward an outlet, comprising:*

*A. a rigid structure having at least two substantially vertical faces and at least three additional faces includ-*

*ing a bottom face, a rear face and a top face, all of the faces being pervious to water but not to undesired debris found in the water, the combination forming a closed three dimensional polygon, at least one face having a hole therein and having a hollow tube attached thereto in communication with the interior of the closed polygon,*

*B. the rear face positioned adjacent to said bottom face and said vertical faces, thereby adjoining said faces, and*

*C. the top face adjoined at some acute angle to said bottom face and also adjoined with said vertical faces and said rear face.*

*38. A filter for a drain system in which water and debris including leaves move along a passageway toward an outlet, comprising:*

*A. a rigid cage-like structure having at least two side faces and at least three additional faces including a bottom face, a rear face and a top face, all of the faces being pervious to water but not to undesired debris found in the water, the combination forming said structure, at least one face having a hole therein and having a hollow tube attached to the face over the hole and thereby being in communication with the interior of the structure,*

*B. the rear face positioned adjacent to said bottom face and said side faces, thereby adjoining said faces, and*

*C. the top face adjoined at some acute angle to said bottom face and also adjoined with said side faces and said rear face.*

*39. A drain filtering device for use in a drain system in which water and debris flow along a passageway toward an outlet, comprising:*

*a porous multi-sided structure having a hollow interior defined by bottom, top, side and rear faces,*

*the bottom face having front and rear edges,*

*the top face being water-pervious and having a lower front edge and opposite side edges, being directly joined at its lower front edge to the front edge of the bottom face, and extending angularly upwardly from the bottom face at an acute angle and forming a ramp that starts at the juncture of the lower front edge and the front edge and inclines upwardly therefrom,*

*the side faces being respectively joined to the side edges of the top face and extending downwardly therefrom,*

*the rear face being joined to the rear edge of the bottom face and extending upwardly therefrom,*

*the top face being an inlet into the structure and one of the bottom, side, and rear faces being an outlet from the interior of the structure; and*

*a positioning member extending outwardly from the structure and adapted to position the structure in the passageway of a drain system so that the structure is in the path of water and debris flowing in the passageway with the bottom face on the bottom of the passageway and with the top face in a position to intercept the flowing water and debris, whereby the water and debris contact the ramp of the top face and the debris is pushed upwardly along the ramp by the water and the water passes through the top face, enters the interior of the structure and exits the interior of the structure through the outlet face and thence into the outlet of the drain system.*

*40. The filtering device of claim 39,*

*wherein said angle is from about 30 degrees to about 45 degrees.*

*41. A drain filtering device comprising:*

*a filter body having opposite sides, a bottom, a front, and a rear,*

*the body having a size and a shape that allows it to be positioned in a drainage channel that contains a stream of flowing water and debris so that the front of the body is positioned upstream of the rear of the body relative to the direction of flow of the water and the debris so that the flowing water and debris initially engage the front of the body,*

*said filter body having a water inlet at the front and a water outlet spaced from the inlet,*

*said filter body also allowing water entering the body through the inlet to pass to and out of the body through the outlet, and*

*the front of the body being a water-pervious ramp extending directly upwardly at some acute angle from the bottom thereby to intercept the flowing water and debris and cause the debris to be diverted outwardly of the flowing stream of water which is allowed to enter the body through the inlet whereby the debris is separated from the water and is prevented from clogging the channel.*

* * * * *